(12) United States Patent
Kanevsky et al.

(10) Patent No.: US 8,527,566 B2
(45) Date of Patent: Sep. 3, 2013

(54) DIRECTIONAL OPTIMIZATION VIA EBW

(75) Inventors: Dimitri Kanevsky, Ossining, NY (US); David Nahamoo, Great Neck, NY (US); Bhuvana Ramabhadran, Mount Kisco, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 12/777,768

(22) Filed: May 11, 2010

(65) Prior Publication Data

US 2011/0282925 A1    Nov. 17, 2011

(51) Int. Cl.
*G06F 7/00*    (2006.01)

(52) U.S. Cl.
USPC .......................................... 708/207

(58) Field of Classification Search
USPC ................................. 708/207, 200
See application file for complete search history.

(56) References Cited

U.S. PATENT DOCUMENTS

| | | | |
|---|---|---|---|
| 6,563,957 B1 * | 5/2003 | Li et al. | 382/252 |
| 2004/0093107 A1 * | 5/2004 | Good et al. | 700/108 |
| 2008/0091424 A1 | 4/2008 | He et al. | |
| 2008/0243503 A1 | 10/2008 | Soong et al. | |
| 2009/0030692 A1 | 1/2009 | Deligne et al. | |
| 2009/0132444 A1 | 5/2009 | Liu et al. | |
| 2009/0138265 A1 | 5/2009 | Willett et al. | |
| 2009/0254496 A1 | 10/2009 | Kanevsky et al. | |

OTHER PUBLICATIONS

Gopalakrishnan, P., et al. "An Inequality for Rational Functions With Applications to Some Statistical Extimation Problems" 1991 IEEE. IEEE Transactions on Information Theory. vol. 37, No. 1. Jan. 1991. pp. 107-113.

Kanevsky, D., et al. "Extended Baum Transformations for General Functions, II" IEEE International Conference on Acoustics, Speech and Signal Processing. ICASSP 2004. Jun. 2005. (9 pages).

Sainath, T., et al. "Broad Phonetic Class Recognition in a Hidden Markov Model Framework Using Extended Baum-Welch Transformations" 2007 IEEE Workshop on Automatic Speech Recognition and Understanding. Dec. 2007. (6 pages).

Sainath, T., et al. "Gradient Steepness Metrics Using Extended Baum-Welch Transformations for Universal Pattern Recognition Tasks" ICASSP 2008. IEEE International Conference on Acoustic, Speech and Signal Processes. Mar.-Apr. 2008. (4 pages).

Sainath, T., et al. "Unsupervised Audio Segmentation Using Extended Baum-Welch Transformations" ICASSP 2007. IEEE International Conference on Acoustic, Speech and Signal Processing. Apr. 2007. pp. 209-212.

* cited by examiner

*Primary Examiner* — Tan V. Mai
(74) *Attorney, Agent, or Firm* — Tutunjian & Bitetto, P.C.; Anne V. Dougherty (57) ABSTRACT

An optimization system and method includes determining a best gradient as a sparse direction in a function having a plurality of parameters. The sparse direction includes a direction that maximizes change of the function. This maximum change of the function is determined by performing an optimization process that gives maximum growth subject to a sparsity regularized constraint. An extended Baum Welch (EBW) method can be used to identify the sparse direction. A best step size is determined along the sparse direction by finding magnitudes of entries of direction that maximizes the function restricted to the sparse direction. A solution is recursively refined for the function optimization using a processor and storage media.

24 Claims, 4 Drawing Sheets

DIRECTIONAL OPTIMIZATION VIA EBW

BACKGROUND

1. Technical Field

The present invention relates to optimization of functions and more particularly to a system and method for optimizing functions with a large number of parameters.

2. Description of the Related Art

Optimization of functions with a large number of parameters is very complex. A few techniques for function optimization include an exact computation of a Hessian matrix for Newton type of optimization methods. This type of computation is difficult since it requires processing around a squared number of parameters. This results in a slow speed and memory overload in many instances.

Hill-climbing algorithms require step sizes being defined for each iteration and also have a relatively slow convergence. Optimization algorithms that are based on approximated versions of Hessians are counter-intuitive and difficult to customize to specific tasks in which a learning ratio is needed to be controlled.

Therefore, there is a need for an optimization method and system for optimization for a large number of parameters that is fast, intuitive and easy to customize to special tasks.

SUMMARY

An optimization system and method includes determining a best gradient as a sparse direction in a function having a plurality of parameters. The sparse direction includes a direction that maximizes change of the function. This maximum change of the function is determined by performing an optimization process that gives maximum growth subject to a sparsity regularized constraint. An extended Baum Welch (EBW) method can be used to identify the sparse direction. A best step size is determined along the sparse direction by finding magnitudes of entries of direction that maximizes the function restricted to the sparse direction. A solution is recursively refined for the function optimization using a processor and storage media.

An optimization method includes determining a best gradient as a sparse direction in a function having a plurality of parameters, the sparse direction including a direction that maximizes change of the function as determined by an optimization method where a sparse direction is defined from sparse regularized constraints. A best step size is determined along the sparse direction by finding magnitudes of entries of direction by solving an optimization problem that is constrained to the sparse direction. A solution to the optimization problem is recursively refined using a processor and storage media until a threshold constraint is met.

A system for optimization of a function with a large number of parameters includes a processor configured to determine a best gradient as a sparse direction in a function having a plurality of parameters. The sparse direction includes a direction that maximizes change of the function as determined by an optimization method where a sparse direction is defined from sparse regularized constraints. The processor is configured to determine a best step size along the sparse direction by solving an optimization problem to find magnitudes of entries of direction that are constrained to the sparse direction. A memory storage device includes a recursively refined stored solution for an optimization solution of the function.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a system and method provides an optimization that can efficiently handle a large number of parameters and is simpler to use than conventional methods. In one embodiment, an optimization splits an optimization recursion process into parts, e.g., two parts. In a first part, optimizational direction is efficiently define via an Extended Baum-Welch (EBW) method for discrete parameters (EBWD). In a second part, a step along the direction is determined. A search for a best step along a direction can be represented as finding magnitudes of entries of direction by parallelizing entries into an independent set of parameters that can be processed independently of each other.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
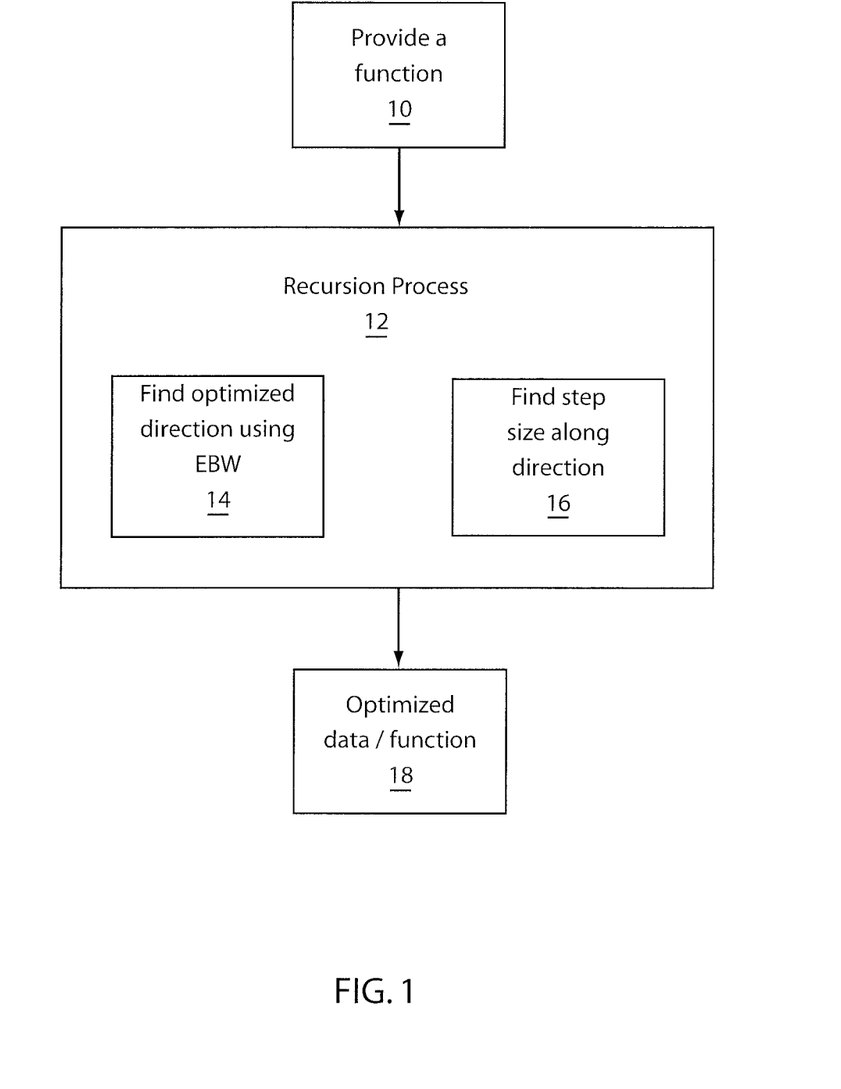
FIG. 1 is a block/flow diagram showing an optimization system and method in accordance with one illustrative embodiment.

Referring now to the drawings in which like numerals represent the same or similar elements and initially to FIG. 1, a block/flow diagram illustratively shows a system/method for optimizing a function in accordance with one exemplary embodiment. In block 10, a function to be optimized is provided. The function may include a large number of parameters (e.g., hundreds or even thousands) which may provide one or more directions which make the solution very complex. A direction of the function at a point is defined as a weighted sum of base vectors that belongs to a linear subspace that passes through this point.

In block 12, an optimization recursion process is split into at least two parts. In block 14, optimizational direction (sparse direction) is efficiently defined via an optimization method, e.g., an Extended Baum-Welch (EBW) method for discrete parameters (EBWD). This will be explained in greater detail below. In block 16, a step along the sparse direction is determined. A search for a best step along directions can be represented as finding magnitudes of entries that are weights identified as non-zero components in the sparse direction. In block 18, an optimized parameter set or optimized data are provided or output for the given function.

It should be understood that the present embodiments may be implemented in a plurality of technologies for a plurality of different optimization applications. As illustratively described the present principles are described with reference to a general function; however, the function may represent any of a plurality of quantities. For example, the function may represent a scheduling function with a plurality of parametric constraints, may represent a vector or tensor with a large number of variables, may represent the motion of an object three dimensions, etc. Other examples of the function include, e.g., a maximum mutual information function that represents information between data and labels of this data, a maximum entropy function, functions associated with a support vector machine, etc. This list is non-exhaustive as it represents but a few possible applications which can be described by a function to be optimized.

In block 14, a direction is defined. EBWD was initially suggested for optimizing an arbitrary (differential) function over a probability discrete domain. To apply EBWD to an arbitrary function for unconstrained optimization, one can represent directions as the following. Let $F(x)$ be a differentiable function (block 10 of FIG. 1) of $$x = \{x_i\}, v = \{v_i\} \in R^n, i = 1, \ldots n, \text{ where} \quad (1)$$

$$\max_v F(v_0 + v) - F(v_0)$$

subject to (s.t.) $\|v\|_1 < \varepsilon$

R is one dimensional real space; $R^n$ is n dimensional real space. Direction is a vector $v=\{v_i\}$ consisting of variables $v_i$. $\|v\|_1$ is norm 1 of a vector $v=(v_1, v_2, \ldots v_L)$ and is defined as $$\|v\|_1 = \sum_{i=1}^{L} |v_i|$$

where $v_i$ are real numbers (components of the vector v) and $|v_i|$ are absolute values of $v_i$. The direction vector v belongs to a subspace that passes through the point $v_0$.

For sufficiently small $\varepsilon$, this approximates finding a best gradient:

$$\max_v \frac{\partial F(v_0 + v)}{\partial v}. \quad (2)$$

Therefore, the gradient of function F(v) at point $v_0$ is computed as $$\left. \frac{dF}{dv} \right|_{v_0} (v).$$

We can replace this expression with the following approximation:

$$\frac{F(v_0 + v) - F(v + w)}{v}$$

adding the constraint that $\|v\|_1 < \varepsilon$. Essentially we replace the step of finding a gradient of maximum growth (the usual step in optimization) with a problem of finding a gradient that gives maximum growth subject to a sparsity regularized constraint. So the optimization is done in accordance with this sparse constraint, e.g., $\|v\|_1 < \varepsilon$. Thus, the gradient problem becomes Eq. (1).

A ball for a norm 1 is a set of vectors that satisfies inequality $\|v\|_1 < \varepsilon$ where $\varepsilon$ is some number (e.g., a threshold). The smaller epsilon, the smaller the ball is. The ball is a metaphoric name. For example, a best gradient includes identifying a size $\varepsilon$ of a directional ball for determining the best direction for a directional optimization problem in parameter space of the plurality of parameters. Given the sparse direction, a larger directional ball R along the sparse direction may be determined (e.g, by performing the extended Baum-Welch method) so that a sub-optimal size inside R can be identified. The R ball is just a notation of a different ball.

In block 16, magnitudes are defined. After a best direction $\tilde{v}$ is defined from Eq. (1), we need to find $x \in R^n$ that optimizes $\max_s F(v_0 + s\tilde{v})$ (3) where $sv = \{s_i\}\{v_i\} = \{s_i v_i\}$ is a multiplication by components.

This can be performed by either using traditional optimization methods or formulating this as a constrained problem with linear domain constraints that can be solved via EBWD.

EBWD is a method for optimizing a general function of a discrete probability domain. The method uses a first derivative and projection on the probability domain. Therefore, it is a large scale method.

Then, a new point can be defined $x=v_0+sv$ as a result of the phases performed in blocks 14 and 16. This is an inteimmediate result. To get a final result blocks 14 and 16 need to be performed recursively, updating point x until some threshold condition(s) is met.

In block 12, the recursion includes starting with a point $x_k$, $k=0$. A sparse direction $\tilde{v}$ is computed using Eq. (1) (block 14). A best step $s=\{s_i\}$ is computed using Eq. (3), and then next point $x_k = s^* \tilde{v}$ (block 16). If threshold criteria are met, stop the process and consider $x_k$ as the outcome of the optimization process. Otherwise, k=k+1 and go to block 14.

Using some mathematical manipulations, we can rewrite function F(v) into another space G(z) and thus the above gradient computation is formulated as $$\max_z G(z)$$

s.t. $\|z\|_q \varepsilon$

Norm q, where q is some positive number, of a vector $z=(z_1, z_2, \ldots z_L)$ is defined as $$\|z\|_q = \sum_{i=1}^{L} (|z_i|^q)^{1/q}.$$

This problem cannot be solved using available algorithms, such as, e.g., LASSO. One problem with LASSO is that it does not work for a large number of parameters. Therefore, we can take F(v) and again with some mathematical manipulation, express it as a function G(z) and thus the gradient computation is formulated as:

$$\max_z G(z)$$

s.t. $\sum z_i = 1, z_1 \geq 0$

This solution has a simple EBW solution for finding magnitudes employed in determined the step sized along a direction. The computation of the gradient can be represented using EBW. EBW for finding magnitude may include the following. Let $\varepsilon > 0$ be an upper boundary that $\|v\|_1$ does not exceed. Let us re-formulate (3) as the following $$\max_m F(x_0 + xv) \quad (4)$$

s.t. $\|x\|_1 \leq \varepsilon$

The solution to Eq. (4) is given below.

DISCRETE EBW: Let F(x) be a differentiable function of $x=\{x_i\} \in R^n$, $i=1, \ldots n$. Let us consider the following problem:

$$\max F(x) \quad (5)$$

s.t. $\|x\|_1 \leq \varepsilon$

We solve this problem by transforming Eq. (26), as set forth below, into a problem over a probability domain for which EBW update rules exist. Let us transform this problem into the following: Turning (26) into an equality, let $x_0 \geq 0$ be a dummy variable and let us consider the following problem with the dummy variable added:

$$\max F(x) \tag{6}$$
$$\text{subject } \|x\|_1 + x_0 \leq \varepsilon.$$

Note adding a dumb non-negative variable is employed to map a fractional ball constrained inequality into a fractionally constrained multi-dimensional sphere. Turning $\varepsilon$ into 1 (norm 1), let $v_i = x_i/\varepsilon$, $i = 0, \ldots n$. Let $F(x) = F(\{\varepsilon v_i\}) = G(v)$ let us consider the following problem $$\max G(v) \tag{7}$$
$$\text{subject to } \sum_i |v_i|_1 + v_0 = 1.$$

This transforms the fractional multi-dimensional sphere into a norm one sphere. The norm one sphere can be mapped into a simplex of non-negative numbers, and an objective function over the norm one sphere may be transformed into the objective function over the simplex of non-negative numbers.

Reduction to discrete EBW: Let us consider the following problem:

$$\max F(x) \tag{8}$$
$$\text{subject to } \|x\|_1 = 1$$

Let us set $$\|x\|_1 = \sum_i |x_i| = \sum_i \sigma(x_i) x_i \tag{9}$$

where $\sigma(x_i) = 1$ if $x_i \geq 0$ and $\sigma(x_i) = -1$ if $x_i \leq 0$. Let $$G(z) = F(\{\sigma(x_i)\sigma(x_i)x_i\}) = F(\sigma(x_i)z_i) \tag{10}$$

where $z = \{z_i\} = \{\sigma(x_i)x_i\}$ Then the Eq. (26) is equivalent to the following problem:

$$\max G(z) \tag{11}$$
$$\text{subject to } \sum z_i = 1, z_i \geq 0.$$

This maps the sphere normalized to one into a simplex of non-negative numbers. An objective function over the norm one sphere may be transformed into an objective function over the simplex.

Problems of the type of Equation (11) have EBW based solutions that can be described as the following:

$$z_i^{t+1} = z_i^{t+1}(D) = \frac{(c_i + D)z_i^t}{\sum_j c_j z_j^t + D} \tag{12}$$

where t is an index and $$c_j = c_j(z^t) = \frac{\partial G(z^t)}{\partial z_j^t}. \tag{13}$$

It has been proved that Eq. (29) provides growth transformations for sufficiently large D if G is a differentiable function in z, i.e., consequent applications of Eq. (29) converge to a local maximum of $G(z)$ in the domain $\Sigma z_i = 1$, $z_i \geq 0$. D is a constant that controls growth of the function that is being optimized.

Reduction to discrete EBW is illustratively depicted in a recursive form. Eq. (8) is represented below in a recursive form.

I) set initial conditions for the recursion. Initially,
$$x^0 = \{x_i^0 \in R^1\} s.t. \|x^0\|_1 = 1 \tag{14}$$

II) $z_i^t = \sigma(x_i^t)x_i^t$ \hfill (15).

III) $G_t(z^t) = F(\{\sigma(x_i^t)\sigma(x_i^t)x_i^t\}) = F(\sigma(x_i^t)z_i^t)$ \hfill (16)

(substitution from block 24).

IV) $c_j = c_j(z^t) = \frac{\partial G_t(z^t)}{\partial z_j^t}.$ \hfill (17)

V) $z_i^{t+1} = z_i^{t+1}(D) = \frac{(c_i + D)z_i^t}{\sum_j c_j z_j^t + D}.$ \hfill (18)

VI) $D^* = \arg\max_D G_t(\{z_i^{t+1}(D)\}).$ \hfill (19)

VII) $x_i^{t+1} = z_i^{t+1}(D^*).$ \hfill (20)

VIII) The program returns to step II. The quantities computed are indexed using index i.

Special numerical example: Let us start with a simple simulation example of a cubic homogenous polynomial $$P = P(z) = \sum_\upsilon a_\upsilon z^\upsilon \tag{21}$$

where $\upsilon = \{\upsilon_0, \upsilon_1, \upsilon_2 | \upsilon_i \geq 0, \Sigma \upsilon_i = 3\}$ is a tuple of integers and $$z^\upsilon = \prod_{i=0}^{i=2} z_i^{\upsilon_i}.$$

In a case that $G_t(z^t) = P(z^t)$:

$$\frac{\partial G_t(z^t)}{\partial z_j^t} = \sum a_\upsilon \upsilon_j z^{\overline{\upsilon}(j)} \tag{22}$$

where $\overline{\upsilon}(j)_i = \upsilon_i$ if $i \neq j$ and $\overline{\upsilon}(j)_j = \upsilon_j - 1$.

CONTINUOUS CASE (GAUSSIAN): Let us start with a simple simulation example of cubic homogenous polynomials $$P=P(Z)=\Sigma a_\upsilon z^\upsilon \quad (23)$$

$$Q=Q(Z)=b_\upsilon z^\upsilon \quad (24)$$

with non-negative coefficients $a_\upsilon$, $b_\upsilon$, where $$z_i(x, \mu, \sigma)=1/2\,\pi^{1/2}\exp(-1/2\,(x_i-\mu)^2/\sigma^2) \quad (25)$$

$i \in \{0,1,2\}$, $x_i$ are arbitrary scalars (we do not require them to be nonnegative or sum up to 1) and $\mu$, $\sigma$ are model parameters. $\upsilon=\{\upsilon_0, \upsilon_1, \upsilon_2 | \upsilon_i \geq 0, \Sigma \upsilon_i = 3\}$ is a tuple of integers and $$z^\upsilon = \prod_{i=0}^{i=2} z_i^{\upsilon_i}.$$

Next, let $F(z)=P(z)/Q(z)$ and $z=\{z_i\}$.

Let us consider the following problem:

$$\max F(x) \quad (26)$$

$$\text{subject } \|x\|_1 = 1$$

We can suggest two different solutions for this problem. The description of the solution is as follows. Let $t=0, 1, \ldots$.

$$G(z^t)=F(\{\sigma(x_i^t)z_i^t\}) \quad (27)$$

where $z_i^0=\sigma(x_i)x_i$, $z_i^t=\sigma(x_i^t)x_i^t$ and $x_i^t$, $z_i^t$ are defined recursively as follows:

$$c_j^t = c_j^t(z^t) = \frac{\partial \log G(z^t)}{\partial z_j^t} \quad (28)$$

$$x_i^{t+1} = x_i^{t+1}(\hat{D}) = \frac{(c_i^t + \hat{D})z_i^t}{\sum_j c_j^t z_j^t + \hat{D}}. \quad (29)$$

Here $\hat{D}$ can be chosen as $$\hat{D} = \underset{D}{\operatorname{argmax}}\, F(x_i^{t+1}(D)). \quad (30)$$

D is a constant that controls growth of the function that is being optimized when $\hat{D}$ is updated. $\hat{D}$ is chosen as which D gives maximum growth (e.g., this needs a solution of an optimization problem (Eq. 30) in D to find $\hat{D}$).

In what follows, we give more detailed calculations for Eq. (28). Let $$z = z_i^t(x, \mu, \sigma) = 1/2\pi^{1/2}\exp(-1/2(x_i^t - \mu)^2/\sigma^2) \quad (31)$$

Let $H(\{z_i^t(x, \mu, \sigma)\}) = G(\{x_i^t\})$ \quad (32)

Then, $\frac{\partial \log G(x^t)}{\partial x_i^t} = \frac{\partial \log H(z^t)}{\partial z_i^t}\frac{\partial z_i^t}{\partial x_i^t} = G(\{x_i^t\})$, where $$h_i^t = h_i^t(z) = \frac{\partial \log R(z)}{\partial z_i} = \frac{\partial P(z)}{\partial z_i}\Big/P(z) = \frac{\partial Q(z)}{\partial z_i}\Big/Q(z). \quad (33)$$

This implies:

$$c_i^t = x_i[h_i^t z_i^t(-x_i^t+\mu)/\sigma^2+C] \quad (34)$$

In simulation experiments one can choose $x_i$ randomly and derive $c_i^t$ from Eq. (34) and update $y_i^t$ by solving Eq. (29). C is a tuning parameter that guarantees convergence. We need to check that updates in Eq. (34) and (29) converge to a local maximum of G(x) for sufficiently large C. Specifically, check that the following inequality is fulfilled for sufficiently large C: $G(x^{t+1}) \geq G(x^t)$. One can also find an optimal C in simulation experiments.

We consider the following unconstrained problem:

$$\max Q(P, \|P\|_1) \quad (35)$$

where $P \in R^L$ and $R^L$ is L dimensional real space.

General loop: Eq. (35) can be solved via the following steps:

1. Set initial value $P^0$
2. Set $d^0 = \|P^0\|_1$
3. Find $P^{t+1}=P^{t+1}(d^t)$ in a functional form of $d^t$ s.t. $\|P^{t+1}\|_1 = d^t$ and $$Q(P^{t+1}, d^t) \geq Q(P^t, d^t) \quad (36)$$

4. Find $d^{t+1}$ s.t.

$$Q(P^{t+1}(d^{t+1}), d^{t+1}) \geq Q(P^{t+1}, d^t) \quad (37)$$

5. Go to Step 3.

The solution of Step 3 includes: Set $x^0 = P^{t+1}/d^t$ and $F(x^0) = Q(P^{t+1}, d^t)$ Run several "EBW" recursions:

a) Set initial conditions $x^0 = \{x_i^0 \in R^1\} \text{ s.t.} \|x^0\|_1 = 1$ \quad (38)

b) $z_i^t = \sigma(x_i^t)x_i^t$ \quad (39)

c) $G_t(z^t) = F(\{\sigma(x_i^t)\sigma(x_i^t)x_i^t\}) = F(\sigma(x_i^t)z_i^t)$ \quad (40)

d) $c_j = c_j(z^t) = \frac{\partial G_t(z^t)}{\partial z_j^t}$ \quad (41)

e) $z_i^{t+1} = z_i^{t+1}(D) = \frac{(c_i + D)z_i^t}{\sum_j c_j z_j^t + D}$ \quad (42)

For some applications we can also use an approximation form of Eq. (29).

$$z_i^{t+1} = z_i^{t+1}(D) = z_i^t + \frac{\sum c_i z_i^t}{D}\left(1 - \frac{z_i^t c_i}{\sum c_j z_j^t}\right). \quad (43)$$

f) Find a "small" D* s.t. $z_i^{t+1}(D^*)$ that satisfies some "external" conditions (e.g., is a "positive" as a covariance matrix, one can use approximate representation Eq. (43) to find D*).

$$G_t(\{z_i^{t+1}(D^*)\}) \geq G_t(\{z_i^{t+1}(D)\}) \quad (44).$$

Remark: To find D* that makes a square covariance matrix positive one needs to solve a quadratic equation in $D^{-1}$:

$$(a_{11} + D^{-1}b_{11})(a_{22} + D^{-1}b_{22}) - (a_{12} + D^{-1}b_{12})^2 \geq 0 \quad (45)$$

where $a_{ij} + D^{-1}b_{ij} = z_i^t + \frac{\sum c_i z_i^t}{D}\left(1 - \frac{z_i^t c_i}{\sum c_j z_j^t}\right).$ g) $x_i^{t+1} = z_i^{t+1}(D^*)$ \quad (46).

Go to Step b).

For an even more general case, we consider the following unconstrained problem:

$$\max \tilde{Q}(P, \|P\|_1, \lambda) \quad (47),$$

where $P \in R^L$, $\lambda \in R^1$. A recursion scheme for (47) includes the following:
1. Find $\lambda^t(P, \|P\|_1)$ that satisfies $$\frac{\partial \tilde{Q}(P^t, \|P^t\|_1, \lambda)}{\partial \lambda} = 0 \quad (48)$$

as function of $P, \|P\|_1$.
2. Solve:

$$\max Q(P, \|P\|_1) = \tilde{Q}(P^t, \|P^t\|_1, \lambda^t(P, \|P\|_1)) \quad (49)$$

Figure 2:
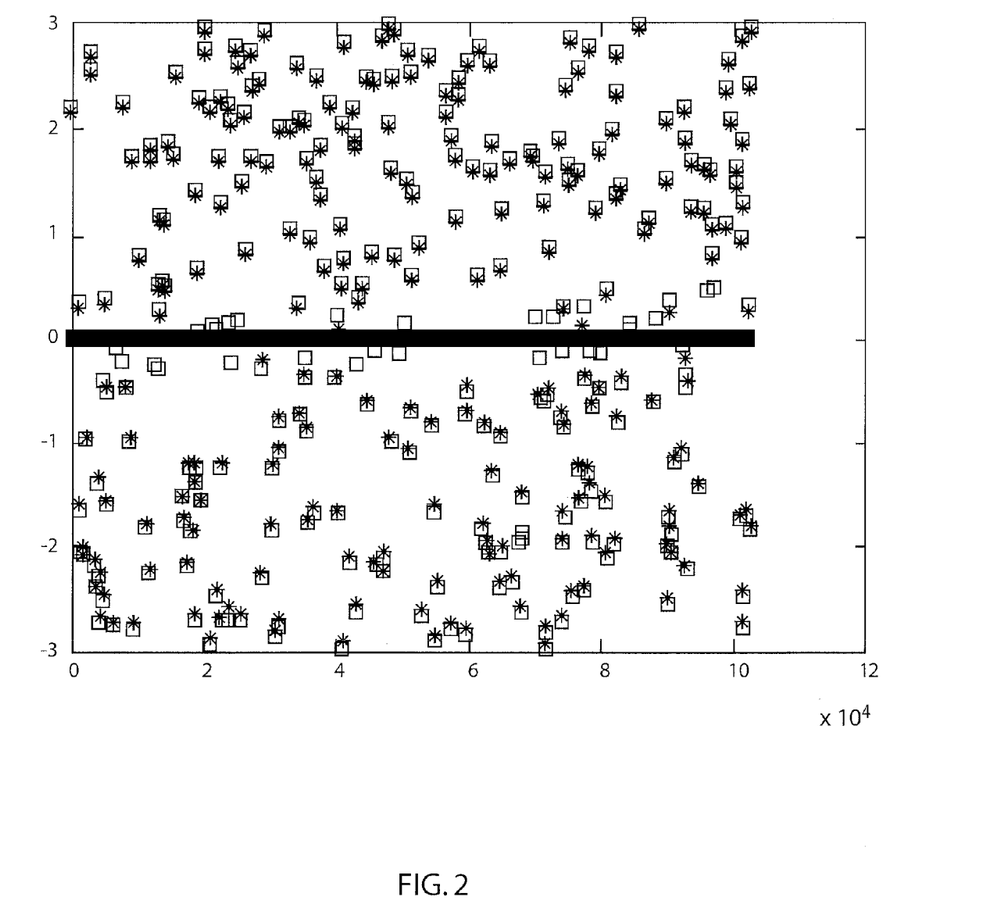
FIG. 2 is a plot showing signal reconstruction with extended Extended Baum Welch (EBW) for 100,000 parameters.

Linear Problems: The benefit of using EBW for gradient computation is that can be used to solve optimization problems of large scale. For example, when trying to solve the following linear problem y=Hx+ϵ, LASSO was unable to solve this problem when the number of parameters x exceeded 100,000 whereas EBW was able to provide a solution. For example, FIG. 2 shows that EBW can reconstruct a noisy signal of 100,000 parameters. The squares in the figure are the true signal and the estimated signals are shown by crosses.

Figure 3:
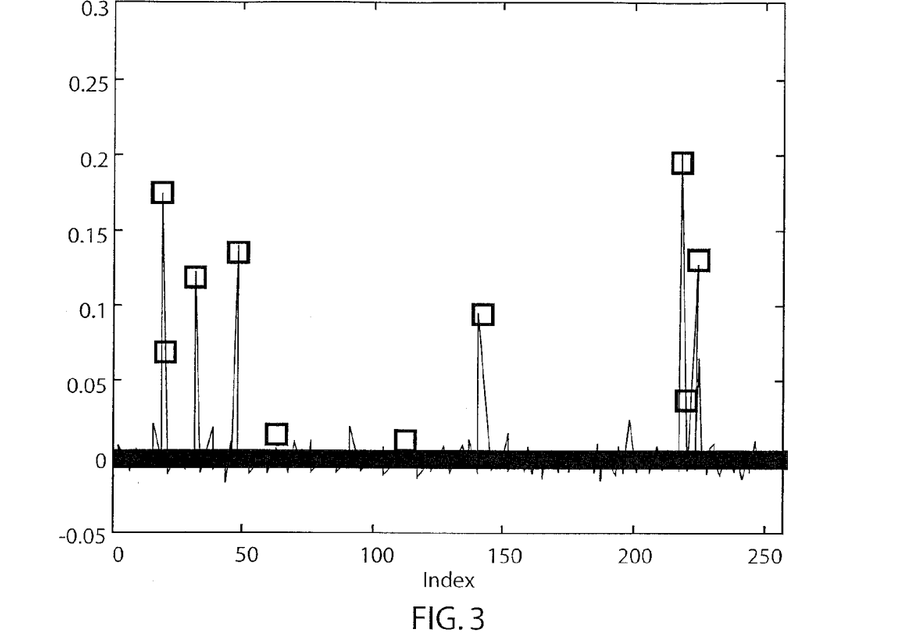
FIG. 3 is a plot showing signal reconstruction with an Extended Kalman Filter (EKF)
Figure 4:
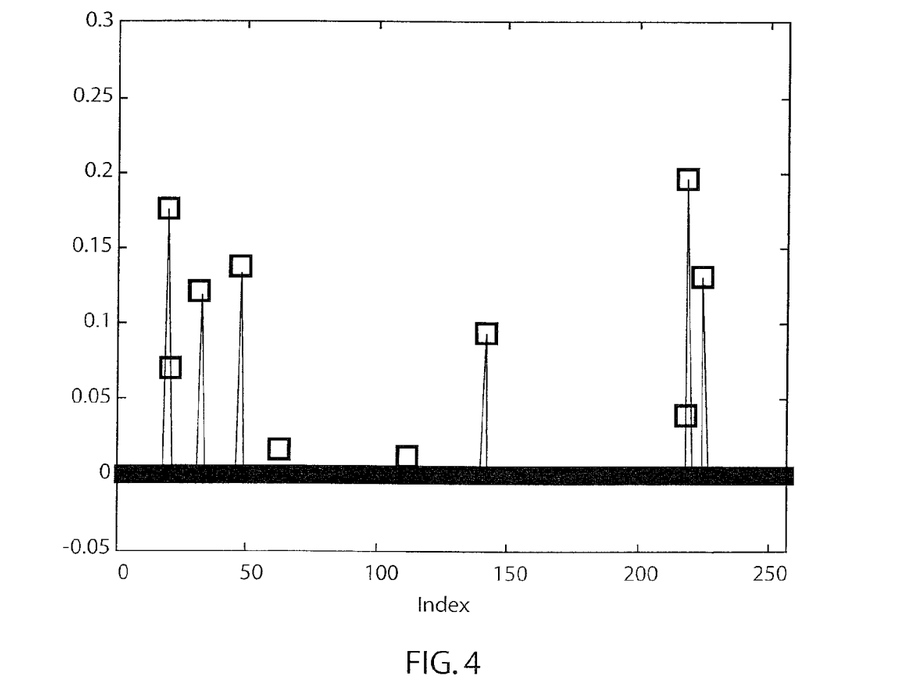
FIG. 4 is a plot showing signal reconstruction with an Extended Baum Welch (EBW) method.

Non-Linear Problems: EBW can also be used to solve non-linear problems of the form y=ƒ(x)+ϵ. Here ƒ(x) is some non-linearity function over parameters x. One approach for solving this non-linear problem is by using an Extended Kalman Filter (EKF). FIGS. 3 and 4 respectfully show signal reconstruction using EKF and EBW. The squares are the true signal and the estimated signal are shown by lines. It can be seen that EBW does a much better job of signal reconstruction compared to EKF.

It should be understood that the optimization in accordance with the present principles provides a wide range of applications. In the example shown, signal reconstruction is performed using the optimization in accordance with the present embodiments. Signal reconstruction is applicable to many areas of endeavor, e.g., data classification, data compression, image processing, model probability density functions, speech recognition, telephony applications, financial market applications, etc. The signal reconstruction can involve a very large number of parameters in many such applications, e.g., in astronomy (when signals from whole space are received by a large number of antennas and a need to reconstruct special kinds of signals from noise generated by space radio signals exists), in fMRI analysis which can involve several hundred thousands of voxels, in telephone networks that can involve billions of Internet nodes where a need exists to analyze network traffic to detect patterns in certain situations (e.g., potential increase in terrorist activities), or in financial markets monitoring.

Figure 5:
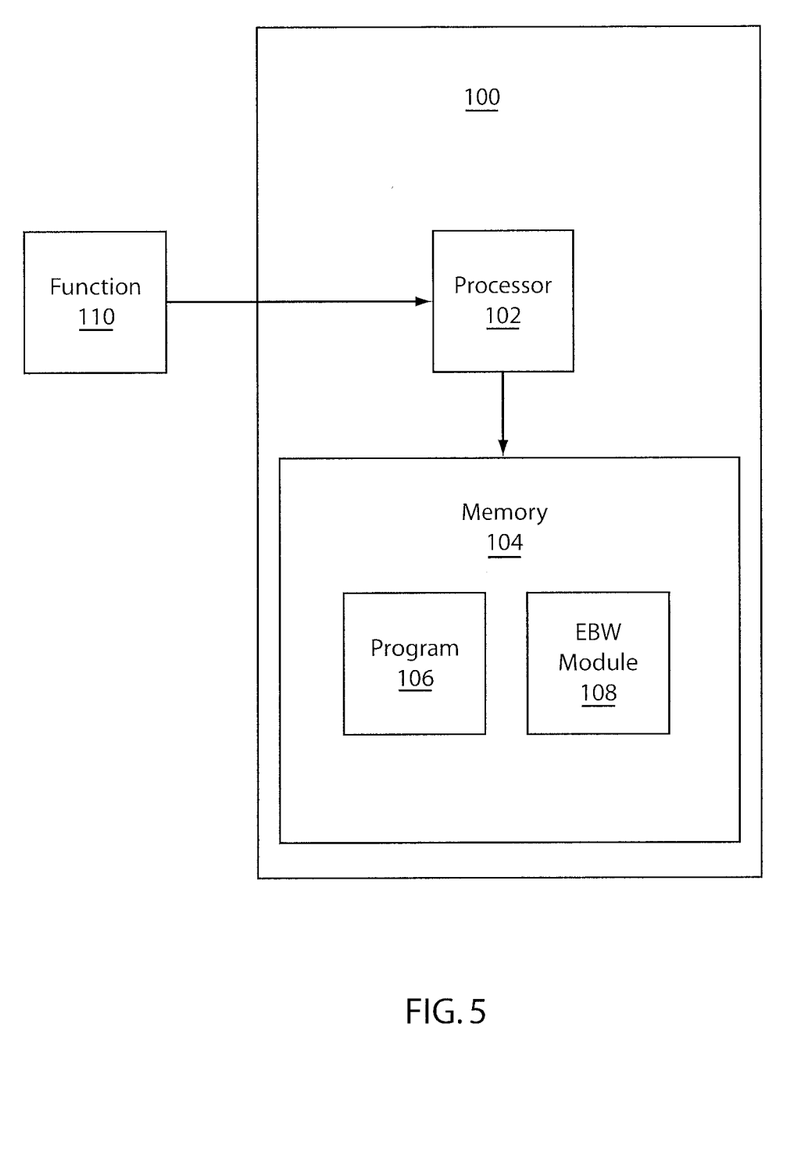
FIG. 5 is a block/flow diagram showing an optimization system in accordance with the present principles.

Referring to FIG. 5, a block diagram shows a system 100 for optimizing a function 110 in accordance with the present principles. System 100 is particularly useful for signal reconstruction applications. System 100 includes at least one processor 102 configured to determine a best gradient as a sparse direction in the function having a plurality of parameters. The sparse direction includes a direction that maximizes change of the function as determined by an optimization method where a sparse direction is defined from sparse regularized constraints. The processor 102 is configured to determine a best step size along the sparse direction by solving an optimization problem to find magnitudes of entries of direction that are constrained to the sparse direction. A memory storage device 104 includes memory storage media. The memory device 104 includes one or more programs 106. The program 106 is configured to recursively refine a stored solution for the function optimization.

The processor 102 and program 106 determine a size E of a directional ball which is employed as a constraint for determining the best direction in parameter space for the plurality of parameters. Alternatively, ϵ may be user selected. The processor 102 preferably performs an extended Baum Welch optimization 108 to identify the sparse direction. This is applied to the directional ball to find the sparse direction through a point of interest. It should be understood that other optimization methods may be employed. Given the sparse direction, the processor 102 and/or program also determines a larger sized ball R along the sparse direction and preferably performs the extended Baum-Welch method to identify a sub-optimal size inside R. Other optimizations methods may also be employed. The function 110 may include a function subject to a fractional normalized constrained inequality. The present principles are particularly useful if the function 110 includes at least 100,000 parameters.

Having described preferred embodiments of a system and method directional optimization via EBW (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. An optimization method, comprising:
    determining a best gradient as a sparse direction in a function having a plurality of parameters, the sparse direction including a direction that maximizes change of the function as determined by an optimization method where a sparse direction is defined from sparse regularized constraints;
    determining a best step size along the sparse direction by finding magnitudes of entries of direction by solving an optimization problem that is constrained to the sparse direction; and
    recursively refining a solution to the optimization problem using a processor and storage media until a threshold constraint is met.
2. The method as recited in claim 1, wherein determining a best gradient includes identifying a size ϵ of a directional ball for determining the best direction for a directional optimization problem in parameter space of the plurality of parameters.
3. The method as recited in claim 2, wherein determining a best gradient includes given the sparse direction, determining a larger directional ball R along the sparse direction; and identifying a sub-optimal size inside R.
4. The method as recited in claim 1, wherein determining a best gradient includes performing an extended Baum Welch method to identify the sparse direction.
5. The method as recited in claim 4, wherein performing an extended Baum Welch (EBW) method to identify the sparse direction includes solving the EBW with the following:

$$z_i^{t+1} = z_i^{t+1}(D) = \frac{(c_i + D)z_i^t}{\sum_j c_j z_j^t + D} \qquad (12)$$

where t, i and j are indexes, $$c_j = c_j(z^t) = \frac{\partial G(z^t)}{\partial z_j^t},$$

D is a constant that controls growth of function values, G is a differentiable function in z, which converges to a local maximum of G(z) in the domain $\Sigma z_i = 1$, $z_i \geq 0$.

6. The method as recited in claim 1, wherein determining a best gradient includes computing the gradient as $$\max_v F(v_0 + v) - F(v_0)$$
$$\text{s.t.} \quad \|v_0\|_1 < \varepsilon$$

where F is the function, v is a direction, direction vector v belongs to a subspace that passes through the point $v_0$, and a sparsity constraint includes $\|v\|_1 < \epsilon$ where $\epsilon$ is a threshold for the sparsity constraint.

7. The method as recited in claim 1, wherein the function includes a function subject to a fractional normalized constrained inequality.

8. The method as recited in claim 7, further comprising:
adding a dumb non-negative variable to map the constrained inequality into a fractionally constrained multi-dimensional sphere;
transforming the fractional multi-dimensional sphere into a norm one sphere;
mapping the norm one sphere into a simplex of non-negative numbers; and
transforming an objective function over the norm one sphere into the objective function over the simplex.

9. A computer readable storage medium comprising a computer readable program for an optimization method, wherein the computer readable program when executed on a computer causes the computer to perform the steps of:
determining a best gradient as a sparse direction in a function having a plurality of parameters, the sparse direction including a direction that maximizes change of the function as determined by an optimization method where a sparse direction is defined from sparse regularized constraints;
determining a best step size along the sparse direction by finding magnitudes of entries of direction by solving an optimization problem that is constrained to the sparse direction; and
recursively refining a solution to the optimization problem until a threshold constraint is met.

10. The computer readable storage medium as recited in claim 9, wherein determining a best gradient includes identifying a size $\epsilon$ of a directional ball for determining the best direction for a directional optimization problem in parameter space of the plurality of parameters.

11. The computer readable storage medium as recited in claim 10, wherein determining a best gradient includes given the sparse direction, determining a larger directional ball R along the sparse direction; and identifying a sub-optimal size inside R.

12. The computer readable storage medium as recited in claim 9, wherein determining a best gradient includes performing an extended Baum Welch method to identify the sparse direction.

13. The computer readable storage medium as recited in claim 12, wherein performing an extended Baum Welch (EBW) method to identify the sparse direction includes solving the EBW with the following:

$$z_i^{t+1} = z_i^{t+1}(D) = \frac{(c_i + D)z_i^t}{\sum_j c_j z_j^t + D} \qquad (12)$$

where t, i and j are indexes, $$c_j = c_j(z^t) = \frac{\partial G(z^t)}{\partial z_j^t},$$

D is a constant that controls growth of function values, G is a differentiable function in z, which converges to a local maximum of G(z) in the domain $\Sigma z_i = 1$, $z_i \geq 0$.

14. The computer readable storage medium as recited in claim 9, wherein determining a best gradient includes computing the gradient as $$\max_v F(v_0 + v) - F(v_0)$$
$$\text{s.t.} \quad \|v_0\|_1 < \varepsilon$$

where F is the function, v is a direction, direction vector v belongs to a subspace that passes through the point $v_0$, and a sparsity constraint includes $\|v\|_1 < \epsilon$ where $\epsilon$ is a threshold for the sparsity constraint.

15. The computer readable storage medium as recited in claim 9, wherein the function includes a function subject to a fractional normalized constrained inequality.

16. The computer readable storage medium as recited in claim 15, further comprising:
adding a dumb non-negative variable to map the constrained inequality into a fractionally constrained multi-dimensional sphere;
transforming the fractional multi-dimensional sphere into a norm one sphere;
mapping the norm one sphere into a simplex of non-negative numbers; and
transforming an objective function over the norm one sphere into the objective function over the simplex.

17. A system for optimization of a function with a large number of parameters, comprising:
a processor configured to determine a best gradient as a sparse direction in a function having a plurality of parameters, the sparse direction including a direction that maximizes change of the function as determined by an optimization method where a sparse direction is defined from sparse regularized constraints;
the processor being configured to determine a best step size along the sparse direction by solving an optimization problem to find magnitudes of entries of direction that are constrained to the sparse direction; and
a memory storage device is configured to store a recursively refined optimization solution of the function.

18. The system as recited in claim 17, further comprising a directional ball of a size $\epsilon$ which is employed as a constraint for determining the best direction in parameter space for the plurality of parameters.

19. The system as recited in claim 18, wherein given the sparse direction, the processor determines a larger sized ball R along the sparse direction; and identifies a sub-optimal size inside R.

20. The system as recited in claim 17, wherein the processor performs an extended Baum Welch to identify the sparse direction.

21. The system as recited in claim 17, wherein a best gradient is determined by:

$$\max_v F(v_0 + v) - F(v_0)$$
$$\text{s.t.} \ \|v\|_1 < \varepsilon$$

where F is the function, v is a direction, direction vector v belongs to a subspace that passes through the point $v_0$ and a sparsity constraint includes $\|v\|_1 < \epsilon$ where $\epsilon$ is a threshold for the sparsity constraint.

22. The system as recited in claim 21, wherein an extended Baum Welch (EBW) method identifies the sparse direction by solving the EBW with the following:

$$z_i^{t+1} = z_i^{t+1}(D) = \frac{(c_i + D)z_i^t}{\sum_j c_j z_j^t + D} \quad (12)$$

where t, i and j are indexes, $$c_j = c_j(z^t) = \frac{\partial G(z^t)}{\partial z_j^t},$$

D is a constant that controls growth of function values, G is a differentiable function in z, which converges to a local maximum of G(z) in the domain $\Sigma z_i = 1$, $z_i \geq 0$.

23. The system as recited in claim 17, wherein the function includes a function subject to a fractional normalized constrained inequality.

24. The system as recited in claim 17, wherein the function includes at least 100,000 parameters.

* * * * *